United States Patent [19]

Tsao

[11] 4,232,324

[45] Nov. 4, 1980

[54] APPARATUS FOR ARRANGING SCANNING HEADS FOR INTERLACING

[75] Inventor: Sherman H. Tsao, Boulder, Colo.

[73] Assignee: International Business Machines Corporation, Armonk, N.Y.

[21] Appl. No.: 912,818

[22] Filed: Jun. 5, 1978

[51] Int. Cl.[3] .............................................. G01D 15/18

[52] U.S. Cl. ........................................ 346/75; 358/296

[58] Field of Search ...................... 346/75, 140 R, 154; 358/293, 296; 400/126, 124, 118; 178/30; 101/93.04, 93.05

[56] References Cited

U.S. PATENT DOCUMENTS

| | | | |
|---|---|---|---|
| Re. 28,219 | 10/1974 | Taylor | 346/75 |
| 3,689,693 | 9/1972 | Cahill | 346/75 X |
| 3,925,790 | 12/1975 | Fischbeck | 346/140 R |
| 4,025,925 | 5/1977 | Jensen | 346/75 |
| 4,059,183 | 11/1977 | Hoskins | 346/75 X |
| 4,063,254 | 12/1977 | Fox | 346/75 |
| 4,112,469 | 9/1978 | Paranjpe | 346/75 X |
| 4,131,898 | 12/1978 | Gamblin | 346/75 |

OTHER PUBLICATIONS

Folchi et al., X-Y Tablet For Array Scanning and Printing, vol. 20, No. 1, Jun. 1977, IBM Tech Disc. Bulletin, pp. 444-446.

Fowler, R. L., InkJet Copier Nozzle Array, IBM Technical Disclosure Bulletin, vol. 16, No. 4, Sep. 1973, pp. 1251-1253.

Bruce, G. D., InkJet Nozzles in a Ring Array, IBM Technical Disclosure Bulletin vol. 18, No. 12, May 1976, pp. 3917-3918.

Pelkie et al., InkJet Head, IBM Technical Disclosure Bulletin, vol. 20, No. 2, Jul. 1977, pp. 553-554.

*Primary Examiner*—Joseph W. Hartary
*Attorney, Agent, or Firm*—Frank C. Leach, Jr.

[57] ABSTRACT

For any selected total number of scanning heads and a required minimum spacing between the scanning heads, the scanning heads are arranged in one or more arrays to read or write substantially parallel lines on a medium or surface at closer distances than the center to center distance of adjacent scanning heads in the indexing direction. The scanning heads in any array do not have to be spaced uniform distances from each other. When the scanning heads are arranged in more than one array, each of the arrays is spaced an arbitrary distance from the adjacent array in the pass direction. To arrange the scanning heads for interlace scanning, they are initially arranged in a single line in the indexing direction with their centers spaced from each other the same distance as the centers of the parallel lines, which are being read or written. Then, some of the scanning heads are shifted in at least one of the pass and indexing directions with any shifting in the indexing direction being a pitch distance or a multiple thereof.

14 Claims, 7 Drawing Figures

FIG. 1
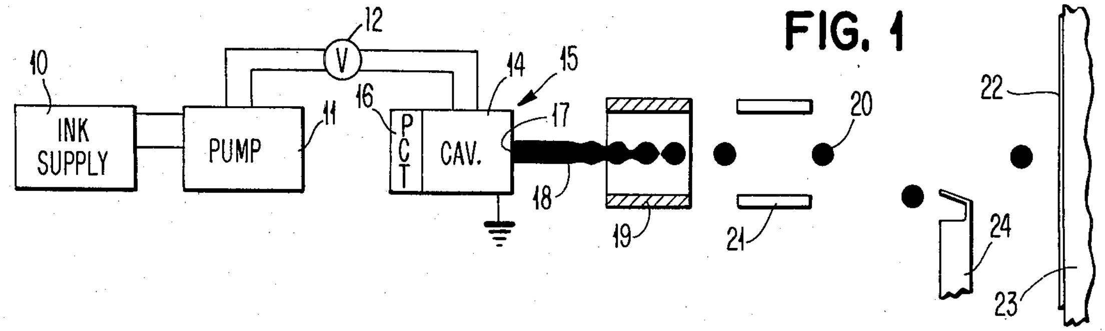
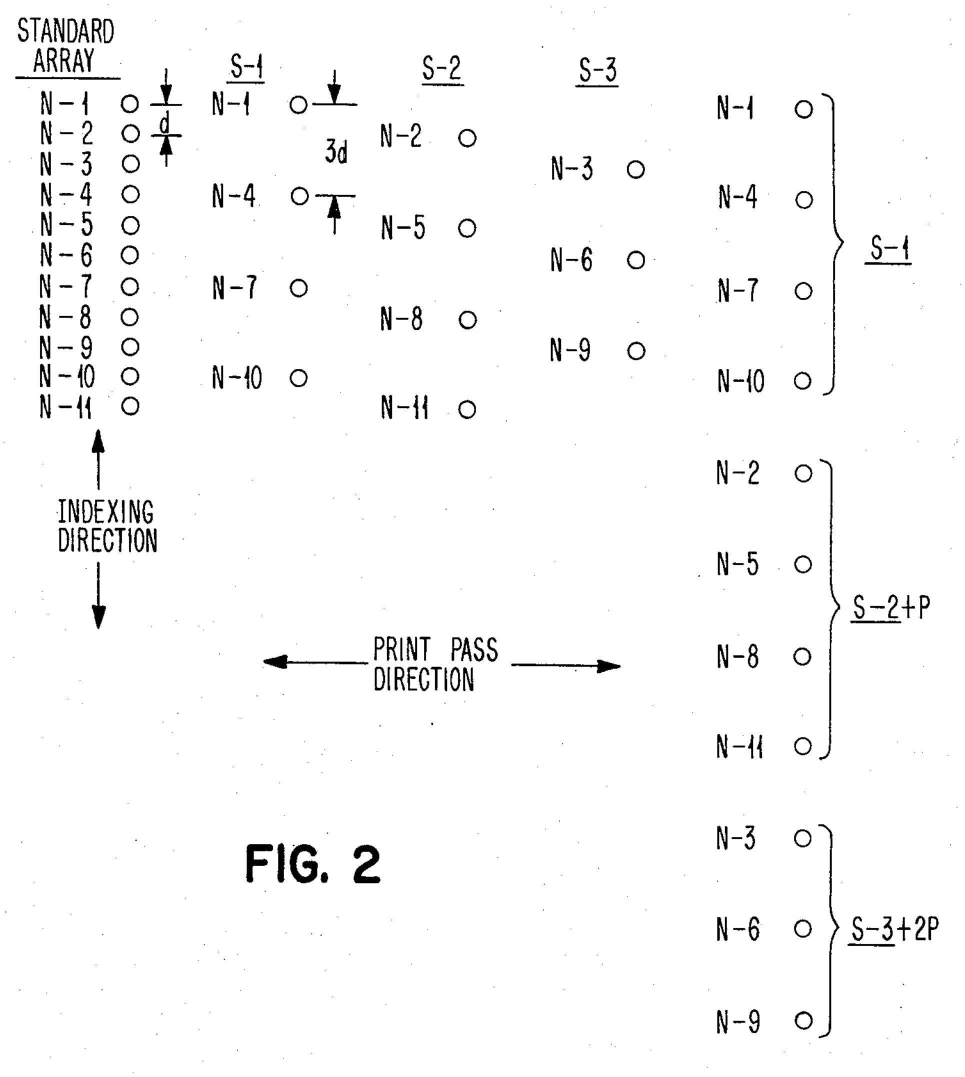
FIG. 2

APPARATUS FOR ARRANGING SCANNING HEADS FOR INTERLACING

In reading and/or writing of recorded information by scanning heads such as magnetic heads, optical heads, ink jet nozzles, wire printers, and thermal printers, for example, the lines of information can be placed closer together on a recording medium or surface than the centers of the scanning heads can be placed relative to each other because of the size of the scanning heads. Therefore, if the recorded information is written with the same spacing as the scanning heads, a large area of the recording medium cannot be effectively utilized. It is desired to be able to utilize the entire area of the recording medium to reduce the cost.

Accordingly, in an ink jet printing apparatus, for example, it is desired for each of the ink jet droplet streams to strike the recording medium so that adjacent lines abut each other. This enables characters to be formed through selecting which of the droplets of each of the streams strike the recording medium.

To obtain quality print, the droplets must be small. However, the nozzles cannot be physically arranged in a single line in an indexing direction at the small distances required for the relatively small droplets. Therefore, it has been necessary to arrange the nozzles so that they will print each line in abutting relation but these abutting lines will not necessarily be produced by adjacent nozzles.

In an ink jet printing apparatus, relative motion between the recording medium and the nozzles causes consecutive droplets to strike the recording medium in abutting positions and form parallel lines. This relative movement is in a print pass direction.

To obtain the parallel printed lines in abutting relation to achieve complete coverage of the recording medium in which the nozzles do not produce all of the parallel printed lines on the recording medium during one print pass, there must be relative motion between the recording medium and the nozzles in a direction substantially orthogonal to the print pass direction to produce each of the lines by using the same nozzles again. This relative movement is in the indexing direction. Relative motion in the indexing direction causes movement for a pitch distance, which is the product of the total number of the nozzles and the desired distance between the centers of the abutting printed lines.

To achieve complete coverage of the recording medium by the abutting printed lines, there must be interlacing. That is, the arrangement of the nozzles must be selected along with the pitch distance so that each of the nozzles produces a separate printed line and there is no omission of a printed line or double coverage of the same printed line.

One arrangement for producing interlacing is shown and described in U.S. Pat. No. 4,069,486 to Fox in which the ink jet nozzles are required to be disposed in a single array and uniformly spaced from each other. The aforesaid Fox patent requires the nozzles to be spaced a distance equal to the product of the distance between the centers of adjacent lines, which is the scan line resolution, and an integer constant with the quotient of the integer constant and the total number of nozzles being an irreducible fraction. The aforesaid Fox patent also requires there to be simultaneous movement in both the print pass and indexing directions. Thus, the aforesaid Fox patent requires a specific relationship between the number of the nozzles and the spacing between the nozzles, all of the nozzles being in a single array and uniformly spaced from each other, and simultaneous movement in both the print pass and indexing directions.

Another arrangement for producing interlacing with ink jet nozzles is shown and described in Reissue Pat. No. 28,219 to Taylor et al. In the aforesaid Taylor et al, patent, interlace printing is obtained through providing a plurality of arrays with each of the arrays having the nozzles arranged in the same configuration and the nozzles covering the entire recording medium in a single pass of the ink jet nozzles relative to the recording medium. Thus, the apparatus of the aforesaid Taylor et al patent requires the nozzles to cover the entire recording medium so that printing occurs in a single pass. Therefore, Taylor et al is not capable of utilizing relative movement in the indexing direction between the nozzles and the recording medium but has only movement of the recording medium in the print pass direction relative to the nozzles.

Another suitable arrangement for producing interlacing is shown and described in U.S. Pat. No. 4,063,254 to Fox et al. The aforesaid Fox et al patent shows a rotating drum with the arrays of nozzles moving longitudinally along the drum as the drum rotates. The aforesaid Fox et al patent requires uniform spacing of the nozzles in each of a plurality of parallel arrays with each array having the same number of nozzles and the nozzles being spaced a distance equal to the product of the distance between the centers of adjacent lines, which is the scan line resolution, and an integer constant with the quotient of the integer constant and the total number of nozzles being an irreducible fraction. The aforesaid Fox et al patent also requires there to be simultaneous movement in both the print pass and indexing directions. Thus, the aforesaid Fox et al patent requires a specific relationship between the number of nozzles and the spacing between the nozzles, the nozzles being in a plurality of parallel arrays with the nozzles in each of the arrays being uniformly spaced from each other, and simultaneous movement in both the print pass and indexing directions. This is a relatively complex arrangement.

The present invention obtains interlacing without requiring that there be a specific relationship between the number of nozzles and the spacing between the nozzles, that there be uniform spacing between the nozzles, that there be only a single array or only a plurality of arrays with the same number of nozzles in each array, that a plurality of arrays having no movement in the indexing direction, or that a compex mechanism be used. The present invention also does not require that the droplets from a nozzle be on a spiral or helix on the recording medium. Thus, the apparatus of the present invention provides an arrangement for interlacing irrespective of the number of nozzles and the required spacing between the nozzles.

Therefore, with the apparatus of the present invention, a configuration of one or more arrays is selected to produce interlacing in accordance with the desired number of nozzles and the minimum spacing between nozzles. Thus, there is no specific requirement for the nozzles to be arranged in a certain number of arrays, the same number of nozzles to be in each array, or that there be more than one array.

With the present invention, interlacing also can occur irrespective of the manner in which the lines are produced on the recording medium. That is, the lines can be produced by the nozzles having relative motion with respect to the recording medium, which may be flat or curved, for example, in a print pass direction and then the recording medium being indexed a pitch distance prior to another sweep of the nozzles across the recording medium. Thus, the apparatus of the present invention is not dependent upon the type of printing mode.

The present invention accomplishes interlacing through initially disposing the total number of nozzles in a single line in the indexing direction, which is the direction in which there is relative motion between the recording medium and the nozzles after lines have been printed by relative movement between the recording medium and the nozzles in the print pass direction. Then, various nozzles are shifted in at least one of the print pass and indexing directions with the shifting in the indexing direction being a pitch distance or a multiple of the pitch distance.

In the preferred embodiment, the initial disposition of the total number of the nozzles in the single line in the indexing direction is with the adjacent nozzles having their centers spaced the distance between the centers of adjacent printed lines; this distance is the scan line resolution. To separate the nozzles so that they are spaced at least the minimum necessary distance because of their structural configuration, the nozzles are divided into disjoint subsets (A disjoint subset does not contain a nozzle in any other disjoint subset.) of nozzles with the total number of subsets being greater than one and no greater than the total number of nozzles.

At least one array is then formed with each array containing at least one of the subsets of the nozzles. Each of the subsets has any nozzle therein in the same relative position to any other nozzle in the subset as the nozzles of the subset initially occupied in the single line in the indexing direction. Any additional subset in an array is positioned with respect to a first subset in the same array so that each nozzle in the subset is disposed from its position in the single line a distance in the indexing direction equal to the pitch distance or a multiple thereof. After disposing one of the arrays at a selected position, any remaining array is positioned relative to the disposed array an arbitrary distance in the print pass direction greater than the minimum spacing required between nozzles.

An object of this invention is to arrange scanning heads to obtain interlacing during scanning of the medium.

Another object of this invention is to record abutting lines on a recording medium by recording elements in which the centers of the abutting lines are closer together than the centers of the recording elements without any significant loss of resolution of the recorded information or throughput.

A further object of this invention is to arrange nozzles of an ink jet apparatus to obtain interlacing.

Still another object of this invention is to print abutting lines by ink jet nozzles in which the centers of the abutting lines are closer together than the centers of the nozzles without any significant loss of print resolution or throughput.

The foregoing and other objects, features, and advantages of the invention will be apparent from the following more particular description of preferred embodiments of the invention as illustrated in the accompanying drawings.

In the drawings:

FIG. 1 is a schematic diagram of an ink jet printing apparatus having its nozzles arranged according to the present invention to produce interlacing.

FIG. 2 is a schematic diagram showing the arrangement of nozzles into disjoint subsets and then being disposed in a single array.

Figure 3:
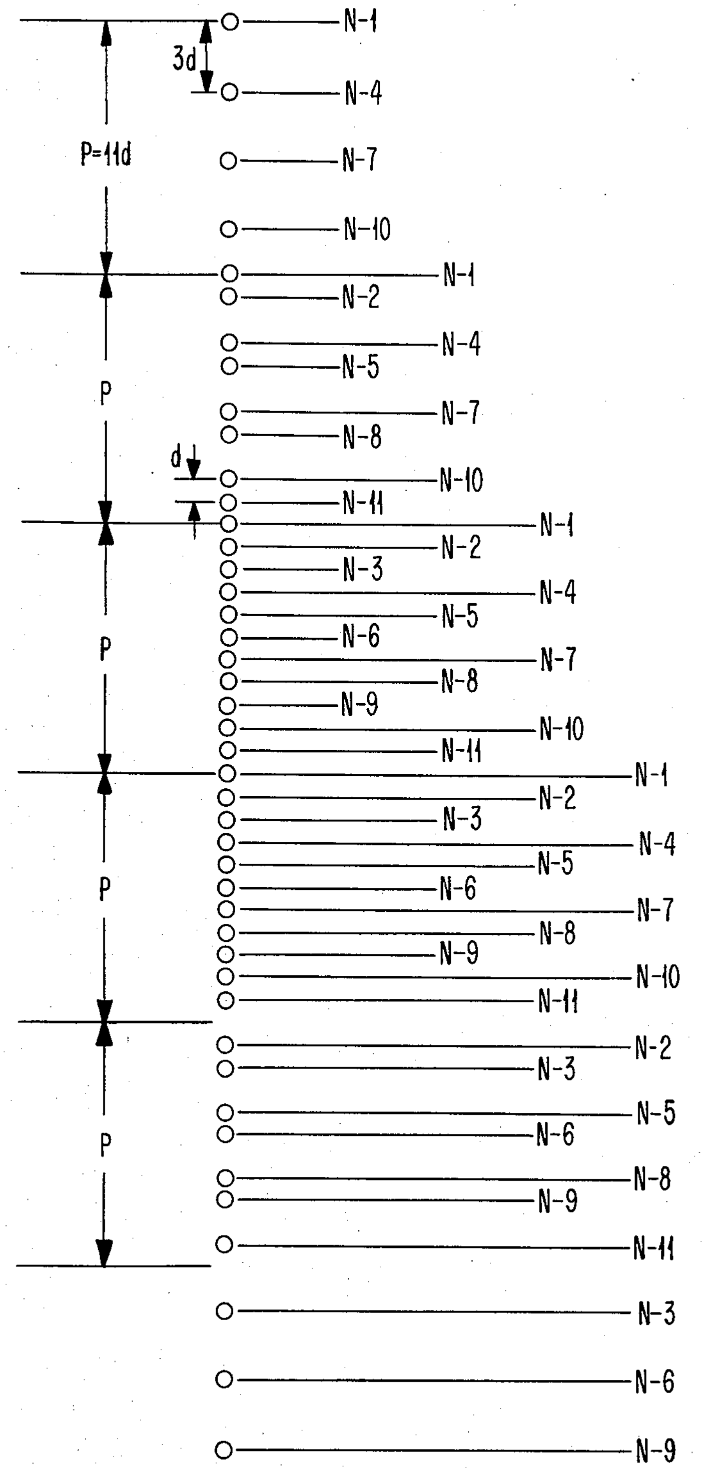
FIG. 3 is a schematic diagram showing the printed lines produced by the array of FIG. 2.

Referring to the drawings and particularly FIG. 1, there is shown a reservoir 10 of ink supplied to a pump 11. The pump 11 is connected through a valve 12, which is opened at the start of a cycle, to an ink cavity 14 in an ink jet head 15 to supply ink under pressure to the ink cavity 14. The ink jet head 15 includes a piezoelectric crystal transducer 16, which applies a predetermined perturbation frequency to the pressurized ink within the ink cavity 14.

The ink jet head 15 has a plurality of nozzles 17 (one shown in FIG. 1) with an ink jet stream 18 flowing from each of the nozzles 17. Each of the streams 18 flows from the nozzle 17 through a charge electrode 19.

Each of the streams 18 breaks up into droplets 20 at a predetermined break-off point, which is within the charge electrode 19. Thus, each of the droplets 20 can be charged or have no charge depending on whether a voltage is applied to the charge electrode 19 when the droplet 20 breaks off.

The droplets 20 move along a predetermined path from the charge electrode 19 to pass through deflection plates 21. If there is no charge on one of the droplets 20, the path of the non-charged droplet 20 is altered as it passes through the deflection plates 21 so that the non-charged droplet 20 strikes a recording medium 22 such as paper, for example, on a flat support 23. If the droplet 20 has been charged for non-printing, the deflection plates 21 deflect the charged droplet 20 so that it will not strike the recording medium 22 but be deposited in a gutter 24.

By arranging the nozzles 17 in accordance with the present invention, the recording medium 22 will have abutting printed lines even though the distance between the centers of the printed lines is less than the distance between the centers of any of the nozzles 17. The nozzles 17 may be arranged in various configurations in accordance with the present invention.

Referring to FIG. 2, there are shown eleven of the 17, identified as nozzles N-1 to N-11, with each having its center spaced a distance d from the adjacent nozzle. The distance d is the distance between the centers of printed lines on the recording medium 22. It will be assumed that the centers of any of the nozzles N-1 to N-11 must be spaced a distance of 3d from the center of any adjacent nozzle because of manufacturing limitations.

In accordance with the present invention, the nozzles N-1 to N-11 must be initially arranged in what is known as a standard array or arrangement with the centers of the nozzles N-1 to N-11 being spaced from each other the distance d in the indexing direction. The indexing direction is the direction in which there is relative motion between the recording medium 22 and the nozzles N-1 to N-11 substantially orthogonal to the print pass direction. A print pass is relative motion of the nozzles N-1 to N-11 with respect to the recording medium 22 or vice versa to print lines on the recording medium 22.

The pitch distance, P, is in the indexing direction and is equal to $N_T d$ where $N_T$ is the total number of nozzles. Thus, in FIG. 2, $N_T=11$ so that the pitch distance, P, is 11*d*.

The nozzles N-1 to N-11 are divided arbitrarily into three subsets S-1, S-2, and S-3. Each of the subsets S-1, S-2, and S-3 has none of the adjacent nozzles N-1 to N-11 therein. Furthermore, since the centers of the nozzles N-1 to N-11 cannot be spaced closer to each other than 3*d* because of manufacturing limitations, it is necessary for the nozzles in any of the subsets S-1, S-2, and S-3 to have the centers of the nozzles therein spaced at least 3*d* from each other.

As shown in FIG. 2, the subset S-1 contains the N-1, N-4, N-7, and N-10 nozzles whereby the centers of these nozzles are spaced a distance of 3*d* in the indexing direction from each other. The subset S-2 has the nozzles N-2, N-5, N-8, and N-11 with each of these having its center spaced a distance of 3*d* in the indexing direction from the center of any adjacent nozzle. The subset S-3 contains the N-3, N-6, and N-9 nozzles with each of these nozzles having its center spaced a distance of 3*d* in the indexing direction from the center of the adjacent nozzle.

After the nozzles N-1 to N-11 have been divided into the three subsets S-1, S-2, and S-3, they are positioned to form one or more arrays. As shown in FIG. 2, the subsets S-1, S-2, and S-3 are formed in a single array. It is necessary for each of the nozzles of the second subset S-2 to be positioned a distance of P in the indexing direction from its position in the standard array. When this occurs, the N-2 nozzle, for example, is disposed a distance of 3*d* from the nozzle N-10 of the subset S-1.

The subset S-2 is disposed so that each of its nozzles is at a distance of 2P in the indexing direction from its position in the standard array. Thus, for example, the nozzle N-3 is disposed a distance of 2P from its disposition in the standard array whereby it is disposed a distance of 3*d* from the nozzle N-11 of the subset S-2.

Accordingly, when the subsets S-1, S-2, and S-3 are arranged as shown in FIG. 2, they will produce the printed lines shown in FIG. 3. All of the printed lines would extend for the same distance in the print pass direction in FIG. 3 but each print pass is shown as a different length for clarity purposes.

Thus, during the first print pass, each of the nozzles N-1 to N-11 prints but the printed lines are spaced a distance 3*d* from each other rather than the desired distance of d. These are the shortest printed lines in FIG. 3.

Then, the nozzle array is indexed a distance of P, and the eleven nozzles N-1 to N-11 again move in the print pass direction. While each of the printed lines produced by the second pass in the print pass direction is again spaced 3*d* from each other, some of these lines are spaced only a distance of d from some of the lines printed in the prior print pass. These lines are shown as the second shortest lines in FIG. 3.

Then, the nozzles N-1 to N-11 are again moved a distance of P in the indexing direction. During the next print pass, the printed lines, produced by this print pass, are again spaced a distance of 3*d* from each other with these being the next to longest lines in FIG. 3. However, the third print pass causes interlacing so that all of the lines produced during the third print pass interlace with lines produced during the first and second print passes. For example, the line produced by the nozzle N-11 in the first print pass is disposed between the line produced by the nozzle N-10 in the second print pass and the line produced by the nozzle N-1 in the third print pass and in abutting relation with each. (For clarity purposes, the printed lines are shown spaced from each other.) The centers of each of these printed lines are only a distance of d apart so that there is interlacing when the third print pass occurs.

Interlacing continues as the nozzles N-1 to N-11 are indexed a distance of P in the indexing direction at the end of each print pass. This continues until printing stops. The printed lines produced during the final two print passes also do not always interlace but some of them do. Thus, the lines produced by the nozzles N-3, N-6, and N-9 of the subset S-3 do not have interlacing during each of the final two print passes. In the last print pass, the nozzles N-2, N-5, N-8, and N-11 of the subset S-2 do not interlace.

Therefore, from FIG. 3 in which there are a total of four print passes being shown, the nozzles N-3, N-6, and N-9 of the subset S-3 produce usable printed lines during the first two print passes in which there is interlacing with printed lines later produced. The nozzles N-2, N-5, N-8, and N-11 produced interlacing printed lines during the second and third print passes. The nozzles N-1, N-4, N-7, and N-10 of the subset S-1 produce interlacing printed lines during the last two print passes with the nozzles N-10 also producing the printed line during its second print pass that is the start of interlacing.

While the above described method depicted in the example of FIG. 2 produces a single array with uniform spacing of nozzles, it need not necessarily do so. For example, if the spacing between nozzles can be as close as 2*d* rather than 3*d*, the nozzles N-5 and N-6, for example, could be interchanged in the subsets S-2 and S-3. The result would be a non-uniform spacing of the nozzles in the array, but the array would still interlace. The specific constraints under which a single array will interlace with uniform spacing of nozzles is the subject of the aforesaid Fox patent. The aforesaid Fox patent does not teach selecting a nozzle arrangement whereby an interlacing array of nozzles may be achieved irrespective of the number of nozzles and the minimum spacing required.

Instead of forming the subsets S-1, S-2, and S-3 as a single array, each of the subsets S-1, S-2, and S-3 could be formed as a separate array with each of the subsets S-2 and S-3 being spaced an arbitrary distance in the print pass direction from the subset S-1. These three arrays of the nozzles N-1 to N-11 would produce printed lines in which portions of the lines on each side would have to be discarded because they never abut other printed lines. That is, the nozzles N-1, N-4, N-7, and N-10 of the subset S-1 would produce printed lines prior to those produced by the nozzles of each of the subsets S-2 and S-3 with these printed lines terminating prior to those produced by the nozzles of each of the subsets S-2 and S-3 due to their locations in the print pass direction. Therefore, it would be necessary to utilize a lesser amount of each printed line in the print pass direction. However, there would be interlacing from the initial print pass of all of the nozzles of the subsets S-1, S-2, and S-3 with this arrangement.

Figure 4:
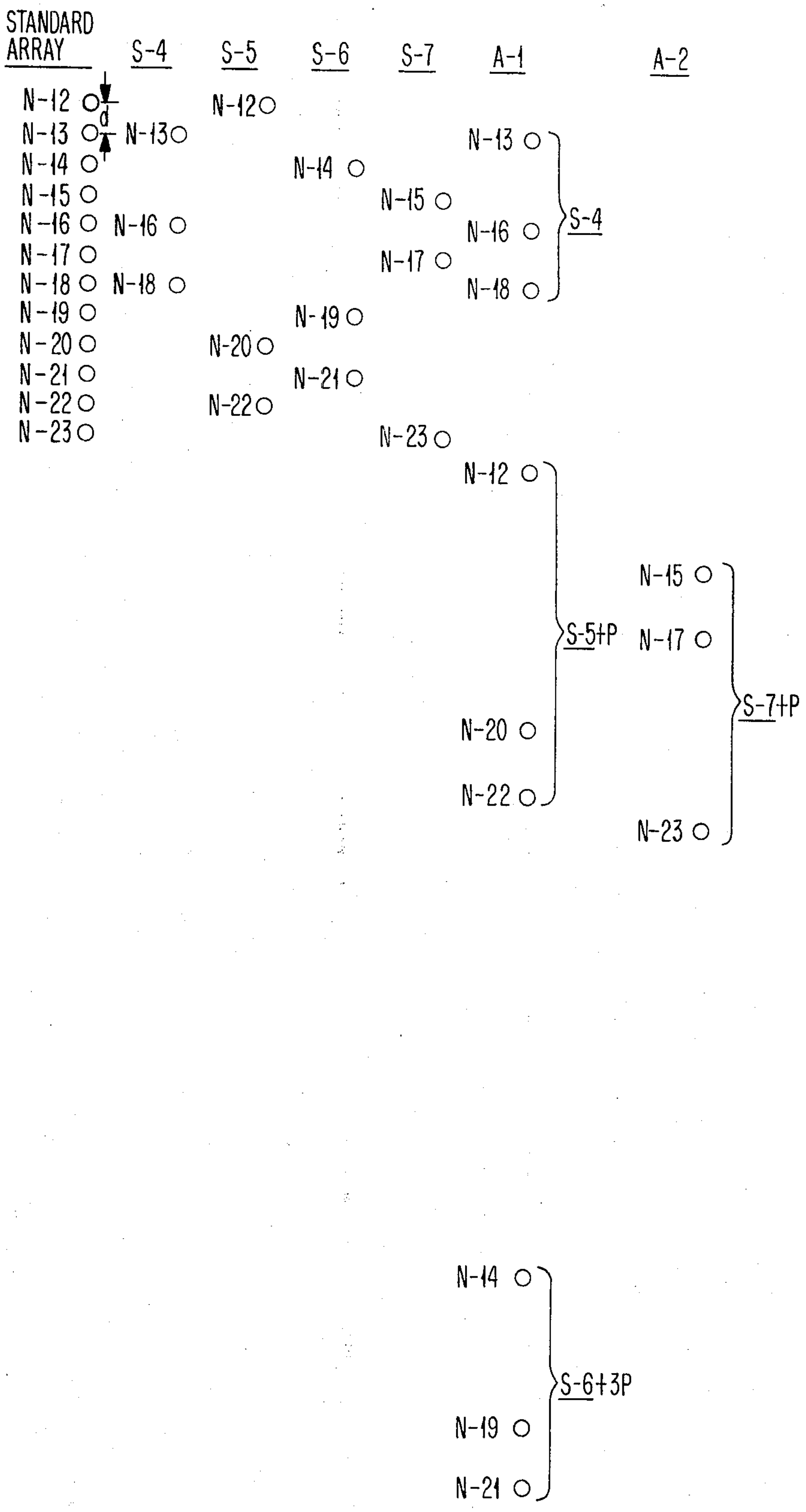
FIG. 4 is a schematic diagram showing the nozzles being arranged in disjoint subsets and then in two reconstituted arrays.

Referring to FIG. 4, there are shown twelve of the 17, identified as nozzles N-12 to N-23, arranged in a single line in the indexing direction with the center of each of the nozzles being spaced a distance of d from an adjacent nozzle to form the standard array or arrangement. The pitch distance, P, in the indexing direction is 12*d* since $N_T$ is 12.

The nozzles N-12 to N-23 are divided into four subsets S-4, S-5, S-6 and S-7 as shown in FIG. 4. The subset S-4 contains the N-13, N-16, and N-18 nozzles, the subset S-5 has the N-12, N-20, and N-22 nozzles, the subset S-6 contains the N-14, N-19, and N-21 nozzles, and the subset S-7 has the N-15, N-17, and N-23 nozzles.

Two arrays A-1 and A-2 are formed from the four subsets. The array A-1 contains the subsets S-4, S-5, and S-6 while the array A-2 has only the single subset S-7.

Each of the subsets S-5 and S-7 is shown disposed with each of its nozzles at the distance of P from its position in the standard array. The subset S-6 is shown as having each of its nozzles disposed a distance of 3P from its position in the standard array.

FIG. 4 is merely an example of how the nozzles could be divided. This will produce interlacing of the lines even though the nozzles are not spaced from each other in the same subset any specific distance. The nozzles in the same subset are spaced from each other at least a distance of 2*d* so that no subset has adjacent nozzles.

Figure 5:
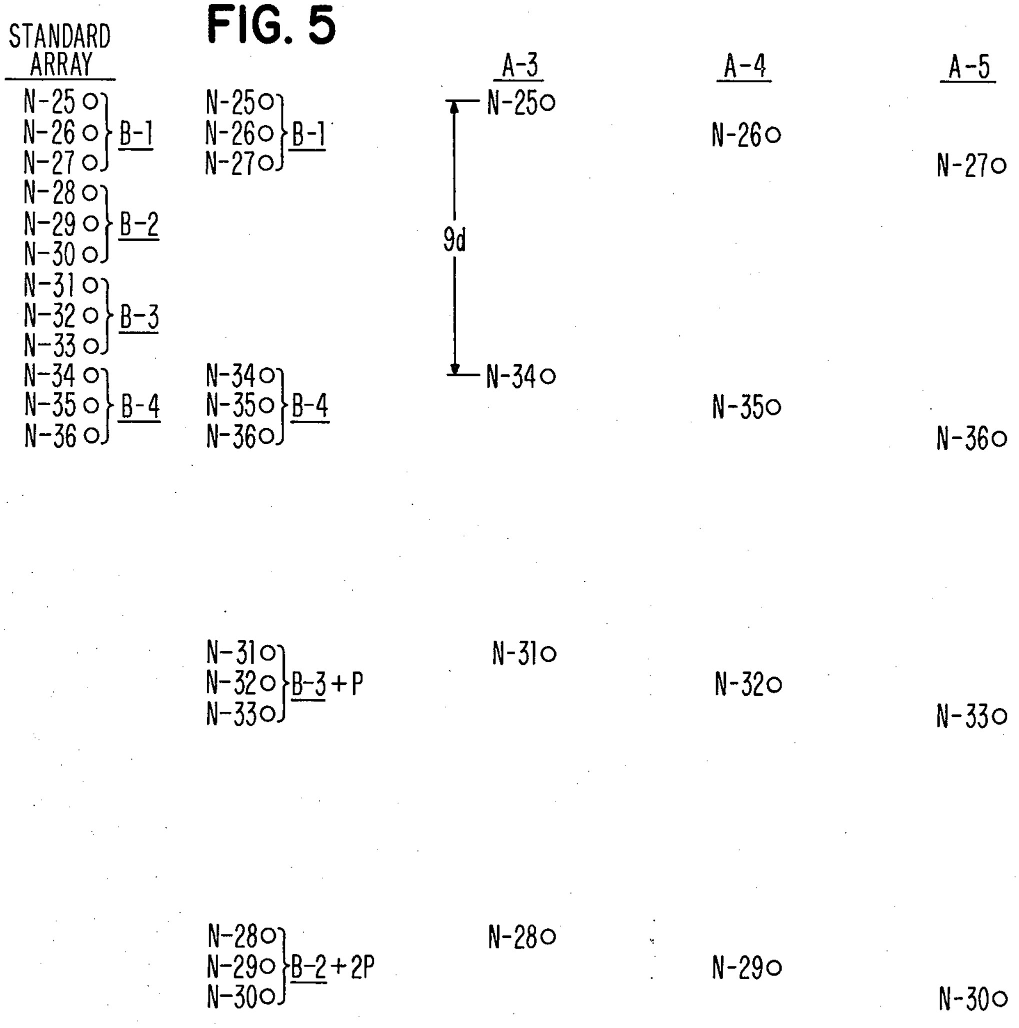
FIG. 5 is a schematic diagram showing the nozzles being arranged in a plurality of arrays after first being formed into bands with the bands then being arranged relative to each other.

Referring to FIG. 5, there are shown twelve of the nozzles 17, identified as N-25 to N-36, arranged in a single line in the indexing direction with each of the nozzles having its center spaced the distance of d from the center of an adjacent nozzle. The nozzles N-25 to N-36 are divided into a number of bands equal to $N_T/M$ where M is the number of arrays and $N_T$ has been previously defined. With $N_T=12$ and it being desired to have the nozzles N-25 to N-36 arranged in three arrays A-3, A-4, and A-5 with each of the arrays A-3 to A-5 having the same number of nozzles, the nozzles N-25 to N-36 will be divided into four bands B-1, B-2, B-3, and B-4. Thus, the number of the nozzles in each of the bands B-1 to B-4 is equal to the number of the arrays so that there are three of the nozzles N-25 to N-36 in each of the bands B-1 to B-4.

Each of the bands B-1 to B-4 must contain the same number of the nozzles with the nozzles in each of the bands B-1 to B-4 having the same spacing therebetween. Each of the bands B-1 to B-4 must contain adjacent nozzles in the single line in the indexing direction. Therefore, the band B-1 has the nozzles N-25, N-26, and N-27, the band B-2 has the nozzles N-28, N-29, and N-30, the band B-3 has the nozzles N-31, N-32, and N-33, and the band B-4 has the nozzles N-34, N-35, and N-36.

Only one of the nozzles in each of the bands B-1 to B-4 is disposed in each of the arrays A-3 to A-5. Furthermore, the same positioned nozzle in each of the bands B-1 to B-4 is utilized in the same array with each of the nozzles being a subset.

The bands B-1 to B-4 must be arranged so that the nozzle in any of the bands is positioned the same distance from the similarly positioned nozzle in the adjacent band with this distance being 9*d* in this example. Therefore, to obtain this, it is necessary to move the band B-3 the pitch distance, P. Since $P=N_Td$ and $N_T=12$, then $P=12d$.

Each of the nozzles in the band B-4 is spaced 9*d* from the corresponding nozzle in the band B-1. Therefore, it is only necessary to move the bands B-2 and B-3. When the band B-3 is moved a distance of P, each of the nozzles in the band B-3 will be spaced 9*d* from the corresponding nozzle in the band B-4. When the band B-2 is moved a distance of 2P, each of the nozzles in the band B-2 will be disposed a distance of 9*d* from the corresponding nozzle in the band B-3.

Accordingly, if the bands B-1 to B-4 are arranged as shown with the nozzle in each of the bands being spaced 9*d* from the corresponding nozzle in the adjacent band, one of the nozzles is taken from each of the bands B-1 to B-4 to form one of the arrays. Therefore, each of the nozzles N-25, N-34, N-31, and N-28 forms a separate subset. These four subsets are utilized to form the array A-3.

Each of the nozzles N-26, N-35, N-32, and N-29 forms a separate subset. Each of these subsets is disposed the same arbitrary distance in the print pass direction from the subsets forming the array A-3 to form the array A-4.

Each of the nozzles N-27, N-36, N-33, and N-30 forms a separate subset. Each of these subsets is disposed the same arbitrary distance in the print pass direction from the subsets forming the array A-3; this is a different distance than the subsets forming the array A-4 are disposed from the array A-3.

Therefore, each of the arrays A-3 to A-5 contains four subsets. This arrangement will produce interlacing of the printed lines.

In the example of FIG. 5, the number of nozzles selected and the spacing prescribed between nozzles produced an arrangement of multiple arrays with uniform spacings between the nozzles. The method of this invention can just as readily produce multiple arrays with non-uniform spacing between nozzles as will be described hereinafter in FIGS. 6 and 7. The particular constraints under which multiple arrays of uniformly spaced nozzles will interlace are taught in the aforesaid Fox et al patent. The aforesaid Fox et al patent does not teach a method whereby any number of nozzles with a given predetermined minimum requirement as to spacing between nozzles may be arranged in multiple arrays to interlace. A particular example showing how the method arranges a nonconstrained number of nozzles to interlace is shown in FIG. 6.

Figure 6:
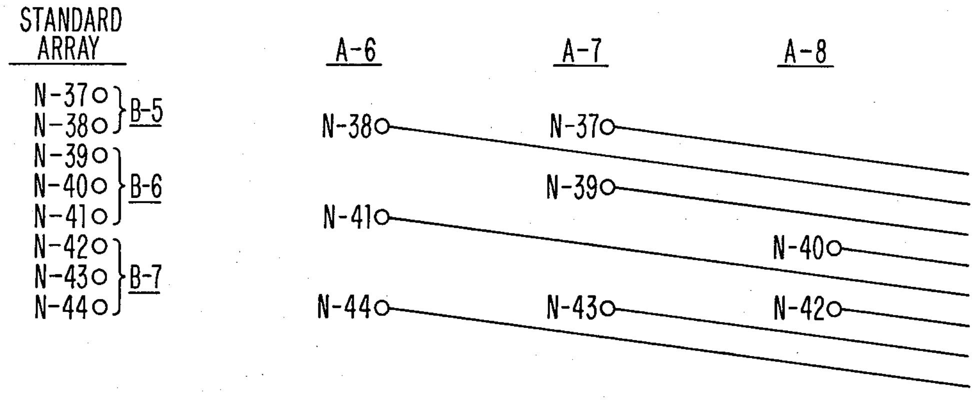
FIG. 6 is a schematic diagram showing another embodiment of the nozzles arranged in accordance with the present invention.

FIG. 6 shows eight of the nozzles 17, identified as N-37 to N-44, arranged in a single line in the indexing direction with each of the nozzles having its center spaced a distance of d from the center of an adjacent nozzle. The nozzles N-37 to N-44 are divided into three bands B-5, B-6, and B-7. The nozzles N-37 and N-38 form the band B-5, the band B-6 comprises the nozzles N-39, N-40, and N-41, and the nozzles N-42, N-43, and N-44 form the band B-7. Thus, the bands B-5, B-6, and B-7 do not comprise the same number of the nozzles N-37 to N-44 in each of the bands as do the bands B-1 to B-4 in the modification of FIG. 5.

The nozzle N-38 of the band B-5, the nozzle N-41 of the band B-6, and the nozzle N-44 of the band B-7 form an array A-6. Therefore, each of the nozzles N-38, N-41, and N-44 forms a separate subset.

Each of the nozzles N-37, N-39, and N-43 forms a separate subset. Each of these subsets is disposed the same arbitrary distance in the print pass direction from the subsets forming the array A-6 to form an array A-7.

Each of the nozzles N-40 and N-42 forms a separate subset. Each of these subsets is disposed the same arbitrary distance in the print pass direction from the subset forming the array A-6 to form the array A-8; this is a different distance than the subsets forming the array A-7 are disposed from the array A-6.

Each of the arrays A-6 to A-8 does not have the same number of nozzles therein. Furthermore, the arrays A-6 to A-8 do not have the same positioned nozzle in each of the bands B-5 to B-7 therein. However, the arrangement of FIG. 6 will produce interlacing of the printed lines.

While the modification of FIG. 5 has disclosed arranging the bands B-1 to B-4 in the indexing direction prior to any shifting of the nozzles into the arrays, it should be understood that the nozzles could be shifted in the print pass direction initially and then shifted in the indexing direction with each of the nozzles in the same band being shifted the same distance in the indexing direction.

While the bands B-1 to B-4 of the modification of FIG. 5 have been described as having the same number of nozzles in each of the bands, it should be understood that such is not necessary if the nozzles are initially shifted in the print pass direction. When the number of the nozzles in each of the bands is not the same as shown in FIG. 6, then each of the nozzles in the same band would not necessarily be shifted the same distance in the indexing direction and the same positioned nozzle in each of the bands would not necessarily be shifted the same distance in the print pass direction.

Therefore, when dividing the nozzles into bands, it is not necessary that shifting of the band in the indexing direction occurs initially or that there necessarily be any shifting in the indexing direction but any shifting in the indexing direction must be the pitch distance or a multiple thereof. It also is not necessary that all the nozzles in any of the bands be shifted in the indexing direction. It further is not necessary that each of the bands have the same number of nozzles therein, but each band must contain successive nozzles in the standard array.

While the starting point for the method of selecting nozzle positions to produce interlacing has been the standard array with the nozzles spaced the distance d apart in the indexing direction, this is not the only starting point from which the method of the invention may begin. It is only necessary that the initial array of the nozzles be arranged to interlace. The simplest configuration is, of course, the standard array with all the nozzles a distance d apart.

Figure 7:
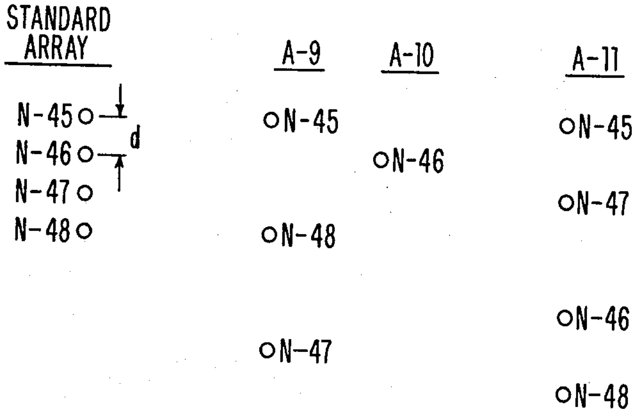
FIG. 7 is a schematic diagram showing a further modification of the nozzles arranged in accordance with the present invention.

For example, in FIG. 7, there are shown four of the nozzles 17, identified as N-45 to N-48, arranged in a single line in the indexing direction and having their centers spaced the distance d apart to form a standard array with each of the nozzles N-45 to N-48 forming a separate subset. To obtain more spacing between the nozzles, the nozzle N-46 could be moved in the pass direction and the nozzle N-47 could be moved the pitch distance, 4*d*, in the indexing direction. This would form arrays A-9 and A-10 as shown in FIG. 7.

Alternatively, the nozzles N-45 to N-48 in the standard array might be arranged in a single array A-11 to interlace. The single array A-11 is formed by moving each of the nozzles N-46 and N-48 the pitch distance, 4*d*, in the indexing direction.

The number of various interlacing arrays that can be formed is infinite. It is only necessary to move the nozzles in at least one of the pass direction and the pitch distance or a multiple of the pitch distance in the indexing direction.

Following the same procedure, any interlacing array or arrays may be changed to another interlacing array. For example, the arrays A-9 and A-10 could be converted to the array A-11 as follows. The nozzle N-46 in the array A-10 would be moved in the pass direction until it was aligned in the indexing direction with the nozzles N-45, N-47, and N-48. Then, the nozzles N-46 and N-48 would be moved down the pitch distance in the indexing direction. Finally, the nozzle N-47 would be moved up the pitch distance in the indexing direction. The result would be the array A-11. Thus, any indexing array or arrays may be changed into another array or arrays that will interlace by following the inventive procedure.

From the foregoing, it is readily observed that interlacing of ink jet streams is obtainable with any number of nozzles and any number of arrays with any spacing therebetween. It is only necessary that the nozzles initially be arranged in a selected interlacing arrangement, which is preferably with the nozzles spaced the distance between the centers of adjacent printed lines in the indexing direction. After arranging the nozzles in the selected interlacing arrangement, any movement of the nozzle in the indexing direction must be a pitch distance or a multiple thereof and any movement in the pass direction must be a distance greater than the required minimum spacing between the nozzles.

While the present invention has shown and described an ink jet apparatus as being the recording apparatus and the ink jet nozzles being the recording elements, it should be understood that the present invention may be readily utilized with other types of recording and scanning apparatuses. For example, the present invention could be utilized with thermal printing, a wire printer, magnetic recording on a magnetic medium, or optical scanners.

While the present invention has shown and described the nozzles as being arranged for use with the recording medium 22 being flat, it should be understood that the support 23 for supporting the recording medium 22 could be a drum so that the recording medium 22 would be curved. When using a drum, the nozzles can be advanced either continuously as the drum is rotating or intermittently at the completion of each revolution of the drum.

It should be understood that the relative movement between the nozzles 17 and the recording medium 22 in the print pass and indexing directions may be accomplished by any well known means. One suitable example of such means is shown and described in the aforesaid Fox et al patent.

It should be understood that the term "array" is used in the claims to include all of the nozzles 17 arranged in any single line in the indexing direction. This is so shown in FIGS. 2, 4, 5, and 7, for example.

An advantage of this invention is that printing of abutting lines can be obtained in which the centers of the abutting lines are closer together than the spacing of the centers of the ink jet nozzles producing the printing. Another advantage of this invention is that full coverage of a page by abutting lines can be obtained with the ink jet nozzles arranged with spacing other than the spacing of the center to center distances of the abutting lines.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A scanning apparatus including:
a medium to be scanned;
an array of a plurality of scanning elements for scanning said medium, said scanning elements being arranged in a single line in the indexing direction;
said scanning elements being spaced non-uniform distances from each other in the indexing direction;
one of said medium and said array having relative movement with respect to the other in a pass direction perpendicular to the indexing direction to cause scanning of substantially parallel lines on said medium;
one of said medium and said array having relative movement with respect to the other in the indexing direction so that each relative movement of said scanning elements and said medium in the pass direction starts a pitch distance from the prior start, the pitch distance being equal to the product of the total number of said scanning elements and the distance between the centers of two adjacent parallel lines on said medium; and
said scanning elements being spaced from each other a distance greater than the distance between the centers of two adjacent parallel lines on said medium while still obtaining scanning of each of the parallel lines on said medium during a plurality of passes in the pass direction.

2. A scanning apparatus including:
a medium to be scanned;
a plurality of scanning elements;
a plurality of arrays of said scanning elements for scanning said medium, each of said arrays having all of said scanning elements therein arranged in a single line in an indexing direction;
one of said medium and said arrays having relative movement with respect to the other in a pass direction perpendicular to the indexing direction to cause scanning of substantially parallel lines on said medium;
one of said medium and said arrays having relative movement with respect to the other in the indexing direction so that each relative movement of said scanning elements and said medium in the pass direction starts a pitch distance in the indexing direction from the prior start, the pitch distance being equal to the product of the total number of said scanning elements and the distance between the centers of two adjacent parallel lines on said medium;
at least one of said arrays of said scanning elements including a plurality of said scanning elements;
at least one of said arrays having said scanning elements non-uniformly spaced from each other in the indexing direction; and
each of said arrays having said scanning elements therein spaced from each other a distance greater than the distance between the centers of two adjacent parallel lines on said medium while still obtaining scanning of each of the parallel lines on said medium during a plurality of passes in the pass direction.

3. A scanning apparatus including:
a medium to be scanned;
a plurality of scanning elements;
at least one array of said scanning elements for scanning said medium, each of said arrays having all of said scanning elements therein arranged in a single line in an indexing direction;
one of said medium and said arrays having relative movement with respect to the other in a pass direction perpendicular to the indexing direction to cause scanning of substantially parallel lines on said medium;
one of said medium and said arrays having relative movement with respect to the other in the indexing direction so that each relative movement of said scanning elements and said medium in the pass direction starts a pitch distance in the indexing direction from the prior start, the pitch distance being equal to the product of the total number of said scanning elements and the distance between the centers of two adjacent parallel lines on said medium;
at least one of said arrays including a plurality of said scanning elements;
one of said arrays being disposed at a selected position;
each of said scanning elements having its center disposed at a selected position in the indexing direction in accordance with its position in an initial selected interlacing arrangement of said scanning elements, the selected position of each of said scanning elements being only one of its position in the initial selected interlacing arrangement, a pitch distance in the indexing direction from its position in the initial selected interlacing arrangement, and a multiple of the pitch distance in the indexing direction from its position in the initial selected interlacing arrangement, at least one of said scanning elements having its center disposed a pitch distance or a multiple thereof in the indexing direction from its position in the initial selected interlacing arrangement;
said scanning elements in any of said arrays having their centers spaced from each other in the indexing direction a distance greater than the distance between the centers of adjacent parallel lines; and
any remaining array of said arrays being disposed relative to said one array an arbitrary distance in the pass direction greater than the minimum spacing required between scanning elements.

4. The apparatus according to claim 3 including:
a plurality of arrays; and
at least one of said arrays having said scanning elements spaced from each other a non-uniform distance in the indexing direction.

5. The apparatus according to claim 4 including:
each of said arrays of said scanning elements including at least one subset of said scanning elements;
each of said subsets including at least one of said scanning elements;
at least one of said subsets in one of said arrays comprising a plurality of said scanning elements; and
each of said scanning elements in at least said one subset being spaced the pitch distance or a multiple thereof in the indexing direction from its position in the initial selected interlacing arrangement.

6. The apparatus according to claim 3 including: only said one array.

7. The apparatus according to claim 3 including a plurality of arrays.

8. The apparatus according to claim 3 in which the initial selected interlacing arrangement was a single line of said scanning elements in the indexing direction with the centers of said scanning elements being spaced the distance between the centers of adjacent parallel lines on said medium.

9. An ink jet printing apparatus including:

a recording medium;

at least one array of ink jet nozzles for directing pressurized ink streams to said recording medium, said nozzles and said recording medium having relative movement in a print pass direction to cause printing of a line from each of said nozzles on said recording medium;

one of said recording medium and said arrays having relative movement with respect to the other in an indexing direction so that each relative movement of said nozzles and said recording medium in the print pass direction starts a pitch distance in the indexing direction from the prior start, the pitch distance being equal to the product of the total number of said nozzles and the distance between the centers of two adjacent abutting printed lines;

at least one of said arrays including a plurality of said nozzles;

one of said arrays being disposed at a selected position;

each of said nozzles having its center disposed at a selected position in the indexing direction in accordance with its position in an initial selected interlacing arrangement of said nozzles, the selected position of each of said nozzles being only one of its position in the initial selected interlacing arrangement, a pitch distance in the indexing direction from its position in the initial selected interlacing arrangement, and a multiple of the pitch distance in the indexing direction from its position in the initial selected interlacing arrangement, at least one of said nozzles having its center disposed a pitch distance or a multiple thereof in the indexing direction from its position in the initial selected interlacing arrangement;

said nozzles in any of said arrays having their centers spaced from each other in the indexing direction a distance greater than the distance between the centers of adjacent abutting printed lines; and any remaining array of said arrays being disposed relative to said one array an arbitrary distance in the print pass direction greater than the minimum spacing required between nozzles.

10. The apparatus according to claim 9 including:

a plurality of arrays; and at least one of said arrays having said nozzles spaced from each other a non-uniform distance in the indexing direction.

11. The apparatus according to claim 10 including:

each of said arrays of said nozzles including at least one subset of said nozzles;

each of said subsets including at least one of said nozzles;

at least one of said subsets in one of said arrays comprising a plurality of said nozzles; and each of said nozzles in at least said one subset being spaced the pitch distance or a multiple thereof in the indexing direction from its position in the initial selected interlacing arrangement.

12. The apparatus according to claim 9 including:

only said one array.

13. The apparatus according to claim 12 including a plurality of arrays.

14. The apparatus according to claim 9 in which the initial selected interlacing arrangement was a single line of said nozzles in the indexing direction with the centers of said nozzles being spaced the distance between the centers of adjacent abutting parallel lines on said medium.

* * * * *